United States Patent [19]

Toyota et al.

[11] Patent Number: 4,547,552

[45] Date of Patent: Oct. 15, 1985

[54] PROCESS FOR PRODUCING A CHEMICALLY BLENDED PROPYLENE POLYMER COMPOSITION AND THE COMPOSITION PRODUCED BY SAID PROCESS

[75] Inventors: Akinori Toyota; Norio Kashiwa, both of Iwakuni, Japan

[73] Assignee: Mitsui Petrochemical Industries, Ltd., Tokyo, Japan

[21] Appl. No.: 680,227

[22] Filed: Dec. 10, 1984

Related U.S. Application Data

[63] Continuation of Ser. No. 428,142, Sep. 29, 1982, abandoned.

[30] Foreign Application Priority Data

Nov. 13, 1981 [JP] Japan .................... 56-181018

[51] Int. Cl.[4] ............................ C08F 297/08
[52] U.S. Cl. ................... 525/247; 525/254; 525/270; 525/322; 525/323
[58] Field of Search .............. 525/247, 254, 270, 323

[56] References Cited

U.S. PATENT DOCUMENTS

| | | | |
|---|---|---|---|
| 4,128,606 | 12/1978 | Furutachi | 525/247 |
| 4,284,738 | 8/1981 | Zukowski | 525/247 |
| 4,284,739 | 8/1981 | Zukowski | 525/270 |
| 4,316,966 | 2/1982 | Mineshima | 525/53 |
| 4,334,041 | 6/1982 | Zukowski | 525/247 |
| 4,339,557 | 7/1982 | Hasuo | 525/247 |
| 4,370,449 | 1/1983 | Bye | 525/247 |
| 4,380,608 | 4/1983 | Hasuo | 525/247 |

Primary Examiner—John C. Bleutge
Assistant Examiner—Patricia Short
Attorney, Agent, or Firm—Sherman & Shalloway

[57] ABSTRACT

A process for producing a chemically blended propylene polymer composition having an ethylene content ranging from 3 to 40% by weight and being greater than the weight of the rubbery propylene copolymer formed in stage (II) below, which comprises the following stages (I) and (II):

(I) a first stage of polymerizing propylene containing 0 to 5 mole % of another olefin in the presence of a catalyst composed of (A) a solid titanium catalyst component consisting essentially of titanium, magnesium, halogen, and an electron donor, (B) an organoaluminum compound, and (C) an organic silicon compound having an Si—O—C bond or an Si—N—C bond to thereby form a crystalline propylene polymer or copolymer; and (II) a second stage of polymerizing propylene and ethylene, or propylene, ethylene and another olefin in the presence of the reaction product of the first stage and the same catalyst as used in the first stage to form a rubbery propylene copolymer and a crystalline ethylene polymer or copolymer.

13 Claims, No Drawings

PROCESS FOR PRODUCING A CHEMICALLY BLENDED PROPYLENE POLYMER COMPOSITION AND THE COMPOSITION PRODUCED BY SAID PROCESS

This application is a continuation of application Ser. No. 428,142, filed Sept. 29, 1982, now abandoned.

This invention relates to a process for producing a chemically blended propylene polymer having improved properties, and the composition produced by the aforesaid process. According to this process, a propylene block copolymer composition suitable for the production of molded articles having excellent impact strength, especially at low temperatures, and excellent rigidity in a well balanced combination can be produced with a high catalytic efficiency without involving an operational trouble.

More specifically, this invention pertains to a process for producing a chemically blended propylene polymer composition having an ethylene content ranging from 3 to 40% by weight and being greater than the weight of the rubbery propylene copolymer formed in stage (II) below, which comprises the following stages (I) and (II):

(I) a first stage of polymerizing propylene containing 0 to 5 mole% of another olefin in the presence of a catalyst composed of (A) a solid titanium catalyst component consisting essentially of titanium, magnesium, halogen and an electron donor, (B) an organoaluminum compound, and (C) an organic silicon compound having an Si—O—C bond or an Si—N—C bond to thereby form a crystalline propylene polymer or copolymer; and (II) a second stage of polymerizing propylene and ethylene, or propylene, ethylene and another olefin in the presence of the reaction product of the first stage and the same catalyst as used in the first stage to form a rubbery propylene copolymer and a crystalline ethylene polymer or copolymer.

The invention also pertains to the chemically blended propylene polymer composition produced by the above process It has been known that a composition having improved impact strength at low temperatures can be obtained by forming a crystalline propylene polymer or copolymer (to be sometimes referred to hereinbelow generically as polypropylene) in the presence of a stereospecific catalyst of varying types in a first stage, and in a second and a subsequent stage, copolymerizing propylene and another α-olefin in the presence of the polypropylene obtained in the first stage to thereby form a rubbery propylene copolymer and/or a crystalline ethylene polymer or copolymer (to be sometimes referred to hereinbelow generically as polyethylene).

The resulting composition is usually an intimate blend of the polymers or copolymers produced in the individual stages, and is generally called a chemically blended polymer. Such a chemically blended polymer finds extensive use in containers, automotive parts, etc. It is desired however to improve its impact strength at low temperatures, especially at −30° C. or below.

From the standpont of its production, the aforesaid process of the prior art has the defect that when the chemically blended polymer is to be produced by slurry polymerization using a solvent, the amount of a rubbery propylene copolymer to be taken into the solid copolymer is small in the stage of producing the rubbery copolymer, and a major proportion of the rubbery copolymer dissolves in the solvent and is not effectively utilized. Furthermore, when a classical titanium trichloride-type catalyst is employed as the stereospecific catalyst, the catalytic activity is not sufficiently high. This causes the disadvantage that after the polymerization, the product must be subjected to a deashing treatment. In addition, the properties of the resulting polymer composition are not entirely satisfactory.

In order to overcome this disadvantage associated with the use of the titanium trichloride-type catalyst component and to produce a polymer or copolymer having improved properties, the present applicants already proposed the use of a highly active titanium catalyst component supported on a magnesium compound (see, for example, Japanese Laid-Open Patent Publications Nos. 98045/1977 corresponding to U.S. Pat. No. 4,128,606 and 88049/1978 corresponding to British Pat. No. 1,566,391). Block copolymerizations using highly active titanium catalyst components are also known from Japanese Laid-Open Patent Publications Nos. 123191/1979, 133587/1979 and 82109/1980.

When copolymerization is carried out in accordance with the specific disclosures of these prior patent documents, the use of a fresh supply of an organoaluminum compound in the stage of producing a rubbery copolymer following the production of polypropylene is desirable in order to achieve a sufficient rate of polymerization. In the stage of producing the rubbery copolymer, especially in the gaseous phase, however, the resulting copolymer is liable to become tacky and may stick to the reactor wall or blocks up the pipings, etc. Thus, unless the melt-kneading of the reaction mixture is performed sufficiently after copolymerization, it is even impossible to obtain the desired properties.

For example, U.S. Pat. No. 4,128,606 proposes the use of a highly active titanium catalyst component, and discloses a process for preparing an impact-resistant chemically blended propylene polymer composition having an ethylene content of 3 to 40 mole%, which consists essentially of the following three steps;

(1) a first step of polymerizing propylene containing 0 to 1 mole% of another olefin in the presence of a catalyst composed of (a) a carrier-supported titanium catalyst component containing at least magnesium, halogen and titanium on the surface of the carrier and (b) an organoaluminum compound to form crystalline polypropylene having an isotactic index of at least 90 which accounts for 55 to 95% by weight of the final polymer composition;

(2) a second step of copolymerizing propylene and ethylene in the presence of the reaction product of the first step and the same catalyst while maintaining the content of propylene in the gaseous phase of the polymerization zone at 65 to 90 mole% thereby to form a low-crystalline propylene/ethylene copolymer having a propylene content of 60 to 85 mole% which accounts for 1 to 10% by weight of the final polymer composition; and (3) a third step of polymerizing ethylene, or both ethylene and propylene in the presence of the reaction product of the second step and the same catalyst while maintaining the content of propylene in the gaseous phase of the polymerization zone at 0 to 15 mole% thereby to form polyethylene or an ethylene/propylene copolymer having a propylene content of up to 10 mole% which has an intrinsic viscosity of at least 2.6 and accounts for 1 to 35% by weight of the final polymer composition.

According to this proposed technique, the carrier-supported titanium catalyst component containing at least magnesium, halogen and titanium may be formed by using an organic silicon compound, or may be further treated with an organic carboxylic acid ester. This patent document, however, fails to describe the use of the catalyst specified in the present application composed of (A) a solid titanium catalyst component, (B) an organoaluminum compound and (C) an organic silicon compound.

The present inventors have made assiduous investigations in order to provide a process for producing a chemically blended propylene polymer, which can overcome the aforesaid technical defects of the prior art. These investigations have led to the discovery that a chemically blended polymer composition having excellent rigidity and excellent impact strength, especially impact strength at low temperatures, in a well balanced combination can be produced with a high catalytic efficiency without involving any of the operating troubles mentioned above by performing multi-step polymerization under a set of combined parameters including the use of a catalyst composed of the components (A), (B) and (C) and the conditions of stages (I) and (II).

It has also been found that by performing polymerization under the aforesaid combined parameters, a chemically blended polymer composition having a better balance of rigidity and impact strength, especially impact strength at low temperatures, than a chemically blended polymer composition obtained with a conventional highly active catalyst can be produced, and even when the rubbery copolymer is produced by the slurry polymerization technique, the amount of the rubbery copolymer taken into the chemically blended polymer composition is large, and the amount of its solvent-soluble portion which dissolves in the solvent and is not effectively utilized in the prior art can be drastically reduced. Another finding of the present inventors is that sufficiently high activity can be maintained in the stage of producing the rubbery copolymer or polyethylene without adding a fresh supply of the organoaluminum compound, and even if this stage is carried out in the gaseous phase, a chemically blended polymer composition of high quality can be obtained without any operational trouble, presumably because homogeneous polymerization is possible.

It is an object of this invention therefore to provide an improved process for producing a propylene chemically blended polymer having improved properties.

The above and other objects and advantages of this invention will become more apparent from the following description.

The highly solid titanium catalyst component (A) used in this invention contains magnesium, titanium, halogen and an electron donor as essential ingredients. In a preferred embodiment, the magnesium/titanium atomic ratio is from about 2 to about 100, preferably from about 4 to about 70; the halogen/titanium atomic ratio is from about 4 to about 100, preferably from about 6 to about 40; and the electron donor/titanium mole ratio is from about 0.2 to about 10, preferably from about 0.4 to about 6. The titanium catalyst component (A) has a specific surface area of preferably at least 3 $m^2/g$, more preferably at least about 40 $m^2/g$, especially preferably from 100 $m^2/g$ to 800 $m^2/g$. Usually, this solid titanium catalyst component (A) does not liberate the titanium compound by a simple means such as washing with hexane at room temperature. Its X-ray spectrum, irrespective of the kind of the starting magnesium compound used in the catalyst preparation, shows amorphousness with respect to the magnesium compound, or is rendered amorphous desirably to a greater extent than that of a usual commercial grade magnesium dihalide.

The solid titanium catalyst component (A) has an average particle diameter of preferably from about 1 to about 200 microns, more preferably from about 5 to about 100 microns, especially preferably from about 8 to about 50 microns, and the geometric standard deviation, $\sigma g$, of its particle size distribution is less than 2.1, preferably not more than 1.95.

The particle size distribution of the titanium catalyst component (A) is determined by using a light transmission method. Specifically, the catalyst component is diluted in an inert solvent such as decalin to a concentration of about 0.01 to 0.5%, putting the diluted catalyst component in a measuring cell, applying a slender ray of light to the cell, continuously measuring the intensity of light which passes through the liquid in a certain sedimented condition of the particles, and thus determining the particle size distribution of the catalyst component. On the basis of the particle size distribution, its standard deviation, $\sigma g$, can be obtained from the logarithmic normal distribution functiuon. The average particle diameter of the catalyst is expressed by a weight average particle diameter.

If the catalyst component (A) has an average particle diameter below the above-specified limit, agglomeration of the polymer or its poor dispersion in the polymerization reactor tends to occur, and the polymerization system may become non-homogeneous or the polymer is difficult to discharge. These troubles hamper the smooth continuous proceeding of copolymerization. If the average particle size of the catalyst component (A) is larger than the specified upper limit, poor dispersion of the polymer tends to occur or the polymerization system tends to become nonhomogeneous. Consequently, the polymerization is difficult to operate continuously in a stable condition, or the quality of the resulting polymer is difficult to stabilize. Hence, the use of the component (A) having an average particle diameter within the specified range is preferred. On the other hand, when the geometric standard deviation, $\sigma g$, of the particle size distribution of the component (A) is larger than the above-specified limit, uniformity in polymerization temperature, the composition of the polymer, etc. is reduced, and this may cause disadvantages in operation and in the quality of the polymer. Accordingly, the geometric standard deviation, $\sigma g$, is preferably less than 2.1. Preferably, the titanium catalyst component (A) is in a regular shape, such as sphere, ellipse, scale, or granule.

The highly active solid titanium catalyst component (A) may contain another element, metal, functional group, etc. in addition to the aforesaid essential ingredients. Or it may be diluted with an inorganic or organic diluent.

Preferably, the solid titanium catalyst component (A) is of such a high performance as can produce a highly stereo-specific polypropylene in an amount of at least about 5000 g per millimole of titanium in the stage of producing polypropylene.

A solid titanium catalyst component (A) which meets all of these preferred conditions can, for example, be provided by performing catalyst preparation using a magnesium compound having an average particle size and a particle size distribution within the aforesaid ranges, or by contacting a magnesium compound in the liquid state with a titanium compound in the liquid phase and adjusting the average particle size and the particle size distribution of the resulting product during catalyst preparation. Such methods per se are known, and disclosed, for example, in Japanese Patent Applications Nos. 43002/1979, 43003/1979, and 75582/1979.

Several embodiments of these methods are described below briefly.

(1) An embodiment in which a complex of a magnesium compound having an average particle size of about 1 to about 200 microns and a geometric standard deviation $\sigma g$ of its particle size distribution of less than 2.1 and an electron donor is reacted with a titanium halide, preferably titanium tetrachloride, which is liquid under the reaction conditions, with or without pre-treating the complex with a reaction aid such as an organoaluminum compound or a halogen-containing silicon compound.

(2) An embodiment in which a magnesium compound in the liquid stage having no reducing ability is reacted with a titanium compound in the liquid state in the presence of an electron donor to precipitate a solid having an average particle diameter of about 1 to about 200 microns and a geometric standard deviation $\sigma g$ of its particle size distribution of less than 2.1, and as required, the solid is further reacted with a titanium compound, preferably titanium tetrachloride, in the liquid state with or without an electron donor.

Examples of the magnesium compound used in the preparation of the solid titanium catalyt component (A) include magnesium oxide, magnesium hydroxide, hydrotalcite, carboxylic acid salts of magnesium, alkoxy magnesiums, aryloxy magnesiums, alkoxy magnesium halides, aryloxy magnesium halides, magnesium dihalides, organomagnesium compounds, and the reaction products between organomagnesium compounds and electron donors, halosilanes, alkoxysilanes, silanols, aluminum compounds, boron compounds or phosphorus compounds, which are produced by various methods.

The organoaluminum compound which may be used in the preparation of the titanium catalyst component (A) may be selected properly from organoaluminum compounds to be described below which can be used in the polymerization of olefins. Examples of the halogen-containing silicon compound which may be used in the preparation of the titanium catalyst component (A) include silicon tetrahalides, alkoxy silicon halides, alkyl silicon halides, and halopolysiloxanes.

A preferred example of the titanium compound used in the preparation of the solid titanium catalyst component (A) is a tetravalent titanium compound of the formula

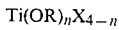

wherein n is a number represented by $0 \leq n \leq 4$, R represents a $C_1-C_{10}$ hydrocarbon group such as an alkyl or aryl group, and X represents a halogen atom.

Examples of the tetravalent titanium compound are titanium tetrahalides, alkoxy titanium halides, aryloxy titanium halides, alkoxy titaniums and aryloxy titaniums. The titanium tetrahalides, above all titanium tetrachloride, are preferred.

Examples of the electron donor which can be used in the production of the titanium catalyst component (A) include oxygen-containing electron donors such as alcohols, phenols, ketones, aldehydes, carboxylic acids, organic or inorganic acid esters, ethers, acid amides and acid anhydrides, and nitrogen-containing electron donors such as ammonia, amines, nitriles and isocyanates.

Specific examples of the electron donor include $C_1-C_{18}$ alcohols, for example, aliphatic alcohols such as methanol, ethanol, propanol, pentanol, hexanol, octanol, dodecanol, octadecanol, aromatic alcohols such as benzyl alcohol, phenethyl alcohol, cumyl alcohol and isopropyl benzyl alcohol and alicyclic alcohols such as cyclohexanol and methylcyclohexanol; $C_6-C_{20}$ phenols which may contain a $C_1-C_{10}$ alkyl group, such as phenol, cresol, xylenol, ethylphenol, propylphenol, nonylphenol, cumylphenol and naphthol; $C_3-C_{15}$ ketones such as acetone, methyl ethyl ketone, methyl isobutyl ketone, and acetophenone; $C_2-C_{15}$ aldehydes such as acetaldehyde, propionaldehyde, octylaldehyde, benzaldehyde, tolualdehyde and naphthoaldehyde; $C_2-C_{30}$ organic acid esters such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, diisobutyl maleate, diethyl butylmalonate, diethyl dibutylmalonate, diethyl 1,2-cyclohexanecarboxylate, di-2-ethylhexyl 1,2-cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, diethyl phthalate, dibutyl phthalate, dioctyl phthalate, gamma-butyrolactone, delta-valerolactone, coumarine, phthalide and ethylene carbonate; alkoxysilanes or aryloxysilanes, such as vinyltriethoxysilane, phenyltriethoxysilane, and diphenylmethoxysilane; $C_2-C_{15}$ acid halides such as acetyl chloride, benzoyl chloride, tolyl chloride, anisoyl chloride and phthaloyl dichloride; $C_2-C_{20}$ ethers such as methyl ether, ethyl ether, isopropyl ether, tetrahydrofuran, anisole, diphenyl ether and ethylene glycol monobutyl ether; $C_1-C_{10}$ acid amides such as acetamide, benzamide and toluamide; $C_2-C_{20}$ carboxylic acid anhydrides such as benzoic anhydride and phthalic anhydride; $C_1-C_{21}$ amines such as methylamine, ethylamine, diethylamine, tributylamine, piperidine, tribenzylamine, aniline, pyridine, picoline and tetramethylethylenediamine; and $C_2-C_{10}$ nitriles such as acetonitrile, benzonitrile and tolunitrile. These electron donors may be used singly or as a mixture of two or more.

The halogen atom constituting the titanium catalyst component (A) may be fluorine, chlorine, bromine, iodine or a mixture of these. Chlorine is especially preferred.

Electron donors having no active hydrogen, such as organic or inorganic acid esters, alkoxysilanes, ethers, ketones, tertiary amines, acid halides and acid anhydrides, are preferred for inclusion in the solid titanium catalyst component (A). Especially preferred are organic acid esters and alkoxysilanes and aryloxysilanes, above all polyesters of aliphatic or alicyclic polycarboxylic acids, aromatic carboxylic acid esters, alkoxysilanes having at least two alkoxy groups, aryloxysilanes having at least two aryloxy groups. Most preferred are polyesters of aromatic polycarboxylic acids, especially those having ester groups at adjacent carbon atoms on the aromatic ring.

Compounds having at least one Al—C bond in the molecule can be used as the organoaluminum compound (B). They include, for example (i) organoaluminum compounds of the general formula $R^1{}_mAl(OR^2)_nH_pX_q$ wherein $R^1$ and $R^2$ may be identical or different, and each represents a $C_1$-$C_{15}$, preferably $C_1$-$C_4$, hydrocarbon group such as alkyl, aryl, alkenyl or cycloalkyl group, X represents a halogen atom, m is a number represented by $0<m\leq 3$, n is a number represented by $0\leq n<3$, p is a number represented by $0\leq p\leq 3$, q is a number represented by $0\leq q<3$, and $m+n+p+q=3$; and (ii) complex alkylated products of a Group I metal and aluminum represented by the general formula $M^1AlR^1{}_4$ wherein $M^1$ represents Li, Na or K, and $R^1$ is as defined above.

Examples of the organoaluminum compounds (i) are compounds of the general formula $R^1{}_mAl(OR^2)_{3-m}$ wherein $R^1$ and $R^2$ are as defined and m is preferably number represented by $1.5\leq m\leq 3$; compounds of the general formula $R^1{}_mAlX_{3-m}$ wherein $R^1$ is as defined, X is halogen and m is preferably a number represented by $0<m<3$; compounds of the general formula $R^1{}_mAlH_{3-m}$ wherein $R^1$ is as defined above and m is preferably a number represented by $2\leq m<3$; and compounds of general formula $R^1{}_mAl(OR^2)_nX_q$ wherein $R^1$ and $R^2$ are as defined above, X is halogen, and $0<m\leq 3$, $0\leq n<3$, and $m+n+q=3$.

Specific examples of the organoaluminum compounds (i) are trialkyl aluminums such as triethyl aluminum and tributyl aluminum; trialkenyl aluminums such a triisoprenyl aluminum; partially alkoxylated alkyl aluminums, for example dialkyl aluminum alkoxides such as diethyl aluminum ethoxide and dibutyl aluminum butoxide, alkyl aluminum sesquialkoxides such as ethyl aluminum sesquiethoxide and butyl aluminum sesquibutoxide, and compounds having an average composition of the formula $R^1{}_{2.5}Al(OR^2)_{0.5}$; partially halogenated alkyl aluminums, for example dialkyl aluminum halides such as diethyl aluminum chloride, dibutyl aluminum chloride and diethyl aluminum bromide, alkyl aluminum sesquihalides such as ethyl aluminum sesquichloride, butyl aluminum sesquichloride and ethyl aluminum sesquibromide, and alkyl aluminum dihalides such as ethyl aluminum dichloride, propyl aluminum dichloride and butyl aluminum bromide; partially hydrogenated alkyl aluminums, for example dialkyl aluminum hydrides such as diethyl aluminum hydride and dibutyl aluminum hydride, and alkyl aluminum dihydrides such as ethyl aluminum dihydride and propyl aluminum dihydride; and partially alkoxylated and halogenated alkyl aluminums such as ethyl aluminum ethoxy chloride, butyl aluminum butoxy chloride and ethyl aluminum ethoxy bromide.

As compounds similar to the compounds (i), organoaluminum compounds in which two or more aluminum atoms are bonded through an oxygen or nitrogen atom may also be used. Examples are $(C_2H_5)_2AlOAl(C_2H_5)_2$, $(C_4H_9)_2AlOAl(C_4H_9)_2$, and

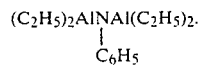

Examples of the compounds (ii) are $LiAl(C_2H_5)_4$ and $LiAl(C_7H_{15})_4$.

Among the above-exemplified organoaluminum compounds, trialkyl aluminums and alkyl aluminum compounds having two or more aluminum atoms exemplified above are preferred.

The organic silicon compound (C) used in this invention together with the catalyst components (A) and (B) is a compound having an Si—O—C bond or an Si—N—C bond. A typical example is an alkoxysilane or an aryloxysilane. Examples are compounds of the following formula $$R_nSi(OR^1)_{4-n}$$

wherein n is a number represented by $0\leq n\leq 3$, R represents a $C_1$-$C_{20}$ hydrocarbon group, a halogen atom or a hydrogen atom, $R^1$ represents a $C_1$-$C_{10}$ hydrocarbon group, and n R groups or $(4-n)$ $OR^1$ groups may be identical or different.

Examples of R are hydrocarbon groups which may be substituted by halogen, amino, etc., for example alkyl, cycloalkyl, aryl, alkenyl, haloalkyl and aminoalkyl groups, halogen atoms, and a hydrogen atom. Examples of $R^1$ are hydrocarbon groups which may be substituted by alkoxy, etc., for example alkyl, cycloalkyl, aryl, alkenyl and alkoxyalkyl groups.

Other examples of the organic silicon compound are siloxanes having the group $OR^1$, and silyl esters of carboxylic acids. As still another example, a compound having no Si—O—C bond and a compound having an O—C bond are reacted either in advance or in situ to form a compound having an Si—O—C bond. For example, the combined use of $SiCl_4$ and an alcohol may be cited. The organic silicon compound may include another metal such as aluminum, tin, or boron.

Specific examples of the organic silicon compound include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, methyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris($\beta$-methoxyethoxy)silane, vinyltriacetoxysilane, trimethoxysilane and dimethyltetraethoxydisiloxane.

Preferred are methyltrimethoxysilane, phenyltrimethoxysilane, methyltriethoxysilane, ethyltriethoxysilane, vinyltriethoxysilane, phenyltrithoxysilane, vinyltributoxysilane, ethyl silicate, diphenyldimethoxysilane, methylphenyldimethoxysilane, and diphenyldiethoxysilane, which are represented by the formula $R_nSi(OR^1)_{4-n}$.

In the process of this invention, polymerization or copolymerization is carried out in the presence of a catalyst formed of the components (A), (B) and (C).

In the first stage (I), propylene is homopolymerized or a major amount of propylene is copolymerized with a minor amount, for example up to 5 mole%, of another olefin such as ethylene, 1-butene, 1-pentene, 1-hexene, 1-ocetene, 1-decene or 4-methyl-1-pentene.

In the production of polypropylene in the first stage (I), the components (A), (B) and (C) of the catalyst may be separately fed into the polymerization system, or any two or three of these components may be pre-mixed. When the three components are pre-mixed, the sequence of mixing is optional. Generally, in mixing the components (A) and (C), the component (B) is desirably present together.

In performing such pre-mixing, it is possible to carry it out in the co-presence of a small amount of an olefin such as propylene or 4-methyl-1-pentene and pre-polymerize it under milder conditions than the conditions for the production of polypropylene in the first stage (I), thereby forming a pre-treated catalyst. This pre-mixing is preferably carried out in an inert hydrocarbon. Illustrative of the hydrocarbon used for this purpose are aliphatic hydrocarbons such as n-pentane, isopentane, n-hexane, n-heptane, n-octane, isooctane, n-decane, n-dodecane, kerosene and liquid paraffin; alicyclic hydrocarbons such as cyclopentane, methylcyclopentane, cyclohexane and methylcyclohexane; aromatic hydrocarbons such as benzene, toluene, xylene and ethylbenzene; and mixtures of these hydrocarbons.

The pre-mixture may be used in the polymerization either directly or after it is washed with an inert hydrocarbon.

The first stage (I) may be carried out in the liquid or gaseous phase in the presence or absence of a solvent. When the solvent is used, it may be such an inert hydrocarbon as exemplified above, or propylene may be used as the solvent.

The suitable amounts of the catalyst components (A), (B) and (C) are such that per liter of the polymerization volume (the volume of the solvent in the case of polymerization in the liquid phase, and the volume of the polymerization zone in the case of polymerization in the gaseous phase), the proportion of the component (A) is about 0.005 to about 0.5 millimole, preferably about 0.001 to about 0.5 millimole, as the titanium atom; the atomic ratio of Al in the component (B) to Ti in the component (A) is from about 1 to about 2000, preferably from about 1 to about 500; and the mole ratio of the component (C) to Ti in the component (A) is from about 0.05 to about 200.

The temperature employed for the polymerization or copolymerization in the first stage (I) may be that which can give a stereospecific highly crystalline polymer. For example, it is about 20 to about 200° C., especially from about 50° to about 90° C. The suitable polymerization pressure is, for example, atmospheric pressure to about 100 kg/cm$^2$, preferably about 2 to about 50 kg/cm$^2$.

Preferably, in the first stage (I), the polymerization is carried out such that the amount of polypropylene formed is about 50 to about 95% by weight, especially from about 60 to about 90% by weight, based on the final chemically blended propylene polymer composition to be finally obtained by the process of this invention.

Production of polypropylene in the first stage (I) may be carried out in two or more steps which may have different polymerization conditions.

In order to obtain a final chemically blended polymer composition having excellent rigidity, polypropylene formed in the first stage (I) preferably has an intrinsic viscosity [η], measured in decalin at 135° C., of 1.0 to 5.0 dl/g, especially 1.0 to 4.0 dl/g, and an isotactic index, measured by $^{13}$CNMR, of at least 85%, especially at least 90%. The intrinsic viscosity of the polymer can be easily adjusted by, for example, using hydrogen during the polymerization.

After the production of polypropylene in the first stage (I), a rubbery propylene copolymer and a crystalline ethylene polymer or copolymer are produced in the second stage (II) in the presence of the polypropylene as obtained in the first stage which contains the catalyst still having polymerization activity.

Various embodiments can be employed in producing the rubbery propylene copolymer and crystalline ethylene polymer or copolymer in the second stage (II). For example, the second stage may be carried out in two separate steps in sequence. Preferably, the rubbery propylene copolymer is first formed (step II-1) and then the crystalline ethylene polymer or copolymer is formed (step II-2) in the presence of the rubbery propylene copolymer formed in step II-1. Or in the second stage (II), the formation of the rubbery propylene copolymer and the formation of the crystalline ethylene polymer or copolymer may be carried out in a single step.

In producing the rubbery propylene copolymer in the second stage (II) subsequent to the production of polypropylene in the stage (I), it is possible, as required, to purge propylene, hydrogen, etc. entrained in the polypropylene from the first stage (I).

The formation of the rubbery propylene copolymer in the second stage (II) may be effected under the same conditions as shown above for the production of polypropylene in the first stage (I).

The olefin to be copolymerized with propylene for the production of the rubbery propylene copolymer is preferably ethylene. Or another olefin or both ethylene and another olefin may be used. Examples of the other olefin are $C_4$-$C_{10}$ α-olefins as exemplified with regard to the stage (I).

Preferably, the rubbery propylene copolymer formed in the second stage (II) is soluble in n-decane at 23° C., and has a propylene content of about 15 to about 85 mole%, preferably about 20 to about 80 mole%. Preferably, the rubbery propylene copolymer formed in the second stage (II) and included in the final chemically blended polymer composition has an intrinsic viscosity [η], measured in decaline at 135° C., of 1 to 15 dl/g, especially 1.5 to 10 dl/g. To obtain such an intrinsic viscosity value, the amount of hydrogen is adjusted as in the case of producing polypropylene in the first stage (I).

The amount of the rubbery propylene copolymer to be included in the final chemically blended polymer composition, which may vary depending upon the desired properties of the final block copolymer composition, is for example, about 2 to about 40% by weight, preferably about 3 to about 30% by weight.

In the step of producing this rubbery propylene copolymer, sufficient polymerization activity can be achieved without adding a fresh supply of the component (B). When it is desired in this step to control the polymerization activity, a fresh supply of the component (C) may be added.

In the production of the chemically blended polymer composition of this invention, the second stage (II) is carried out such that a crystalline ethylene polymer or copolymer (to be sometimes referred to generically as polyethylene) is included in the final chemically blended polymer together with the rubbery propylene copolymer in order to improve the low-temperature impact strength of the chemically blended polymer composition without too much reducing its rigidity. When only the rubbery propylene copolymer is included in the chemically blended polymer composition, an improvement in low-temperature impact strength is observed correspondingly to the amount of the rubbery propylene copolymer included. But as the amount of the rubbery propylene copolymer increases, the rigidity of the chemically blended polymer composition is reduced to an increasing degree, and the properties of the polypropylene are impaired. On the other hand, when only polyethylene is included without the rubbery propylene copolymer, the effect of improving the impact strength of the chemically blended polymer composition is little. Accordingly, both the rubbery propylene copolymer and polyethylene must be incorporated.

As stated hereinabove, polyethylene can be produced simultaneously with the production of the rubbery propylene copolymer or in a separate step.

The simultaneous production in a single step of polyethylene and the rubbery propylene copolymer utilizes the fact that in contrast to a vanadium-type catalyst used, for example, in the general production of EPDM, the catalyst system in accordance with this invention gives a copolymer having a relatively broad distribution of composition in the copolymerization of ethylene and propylene. For example, when polymerization is carried out under such conditions as to give a copolymer having a propylene content of about 15 to about 50 mole% on an average, the ratio of the rubbery propylene copolymer to polyethylene formed can be adjusted to 10-95:90-5, although this may vary depending upon the ratio of the rubbery propylene copolymer and polyethylene formed. In this case, the n-decane-soluble (at 23° C.) portion of the resulting polymer composition is the rubbery propylene copolymer, and its insoluble portion is polyethylene (crystalline ethylene polymer or copolymer).

On the other hand, when it is desired not to form polyethylene in too large a proportion in the step of forming the rubbery propylene copolymer, polymerization is carried out in such a way as to produce a copolymer having a propylene content of about 50 to about 85 mole%, preferably about 60 to about 85 mole%, on an average.

When polyethylene is to be formed in a separate step, the polyethylene-forming step is preferably provided after the step of forming the rubbery propylene copolymer. In this case, polyethylene is produced in the copresence of the polypropylene formed in the first stage (I), the rubbery propylene copolymer formed in step (II-1) of the second stage (II) and at times, polyethylene as well. The polymerization conditions for the step of polyethylene formation may be the same conditions as described above with regard to the production of polypropylene in the first stage (I).

In any case, polyethylene produced preferably has an intrinsic viscosity $[\eta]$, measured in decalin at 135° C., of 0.5 to 20 dl/g, especially about 1 to about 15 dl/g. The ethylene content of the chemically blended polymer composition is, for example 3 to 40% by weight, preferably 4 to 40% by weight, especially preferably 5 to 35% by weight. The total weight of ethylene in the final chemically blended polymer composition obtained in the second stage (II) is greater than the weight of the rubbery propylene copolymer obtained in the second stage (II), preferably at least 1.1 times, more preferably at least 1.2 times, the latter.

The polyethylene content of the chemically blended polymer composition, may be for example, 3 to 40% by weight, preferably 4 to 40% by weight, more preferably 5 to 35% by weight.

In the resulting chemically blended polymer composition, the melting points of polyethylene and polypropylene can be observed by a differential scanning calorimeter (DSC) in its portion insoluble in n-decane at 23° C. It contains usually 3 to 50% by weight, preferably 4 to 45% by weight, especially preferably 5 to 40% by weight, of ethylene.

The proportions of portions soluble or insoluble in n-decane at 23° C., as given in the present specification, are determined after dissolving 5 g of the sample in 750 cc of n-decane at 150° C., and then cooling the solution to 23° C.

The formation of polypropylene in the first stage (I), and the formation of the rubbery propylene copolymer and polyethylene in the second stage (II) need not always to be carried out in the same phase. For example, all the polymerizations may be carried out in the liquid phase. Or the polypropylene is produced in the liquid phase, and the rest of the process is carried out in the gaseous phase. Or the polypropylene is produced in two steps in the liquid and gaseous phase respectively, and the rest of the process is carried out in the gaseous phase.

Even when the rubbery propylene copolymer is formed in accordance with this invention in the liquid phase, the amount of the copolymer which dissolves in the liquid phase is small and its loss is reduced. Furthermore, gaseous-phase polymerization for the production of the rubbery propylene copolymer can be operated without any trouble such as the adhesion of the polymer to the reactor wall. In addition, the final chemically blended polymer composition obtained by the process of this invention has excellent rigidity and impact strength in a well balanced combination.

The following examples illustrate the process of this invention more specifically.

EXAMPLE 1

Synthesis of a catalyst

A 3-liter autoclave was thoroughly purged with nitrogen gas, and then charged with 1.5 liters of purified kerosene, 75 g of commercially available $MgCl_2$, 109 g of ethanol and 10 g of Emasol 320 (a trademark for sorbitan distearate produced by Kao-Atlas Co., Ltd.). The mixture was heated with stirring, and stirred at 125° C. for 20 minutes at a speed of 600 rpm. The pressure of the inside of the autoclave was adjusted to 10 $kg/cm^2$ (G) by nitrogen gas. A cock attached to a SUS stainless steel tube, 3 mm in inside diameter, connected directly to the autoclave and kept at 125° C. was opened to transfer the mixture to a 5-liter glass flask equipped with a stirrer containing 3 liters of purified kerosene cooled at $-15°$ C. The amount of the mixture transferred was 1 liter, and the time required for the transfer was about 20 seconds. The resulting solid was collected by filtration, and thoroughly washed with hexane. Microscopic observation showed that the solid consisted of complete spherical particles having a particle diameter of 5 to 30 microns. A 3-liter glass flask was charged with 1.5 liters of $TiCl_4$, and then with stirring at 20° C., with 75 g of the aforesaid solid suspended in 150 ml of purified kerosene. Furthermore, 12.9 ml of diisobutyl phthalate was added, and the mixture was heated to 120° C. The mixture was stirred for 1 hour, and then the stirring was stopped. The supernatant liquid was removed by decantation, and 1.5 liters of $TiCl_4$ was freshly added. The mixture was stirred at 130° C. for 2 hours. The solid portion was collected by hot filtration, and washed thoroughly with hot kerosene and hexane to form a titanium composition containing 2.3% by weight of tetravalent Ti, 63.0% by weight of Cl, 20.0% by weight of Mg and 9.9% by weight of diisobutyl phthalate.

Polymerization

A 50-liter autoclave was fully purged with propylene, and then charged with 13.5 kg of propylene, 0.82 g of triethyl aluminum, 0.58 g of phenyltriethoxysilane and 0.25 g of the Ti catalyst component prepared as above. After adding 81 liters of hydrogen, the mixture was heated to 70° C., and stirred for 1 hour. After removing liquid propylene at 70° C., a gaseous mixture of ethylene and propylene (the mole ratio of ethylene/propylene was 50:50) at 60° C. was introduced into the autoclave for 53 minutes at a rate of 600 liters/hr. After reducing the pressure, the system was again pressurized to 1.5 atms. with nitrogen at 70° C. Ethylene was added for one hour at a rate of 250 liters/hr. After the polymerization, 7.42 kg of a white powdery polymer was obtained. No adhesion of a tacky polymer to the reactor wall was observed. The polymer powder had a flowability index (measured by a powder tester manufactured by Hosokawa Powder Engineering Institute) of 93, an apparent density of 0.46 g/ml, an ethylene content, determined by its infrared absorption spectrum, of 15.1 mole% (10.5% by weight), and an MFR of 19.0 g/10 minutes. The proportion of that portion which was soluble in n-decane at 23° C. was 6.4% by weight, and this n-decane-soluble portion had an intrinsic viscosity $[\eta]$ of 4.1. That portion of the polymer which was insoluble in n-decane at 23° C. had an intrinsic viscosity of 2.26 dl/g, an ethylene content of 12.3 mole%, and a melting point, determined by DSC, of 124° C.

The proportion of polypropylene formed in the first stage was 81%, and it had a total boiling n-heptane extraction residue of 97.5%. The proportion of the rubbery propylene copolymer formed in the first step of the second stage was 14% by weight, and the proportion of polyethylene obtained in the second step of the second stage was 5% by weight.

An antioxidant was added to the resulting polymer composition. The mixture was granulated and molded to form test samples. The samples were found to have a falling dart impact strength ($-20°$ C.) of 200 kg-cm, an Izod impact strength ($-10°$ C.) of 7.0 kg-cm/cm and a flexural modulus of 14500 kg/m².

EXAMPLE 2

Synthesis of a catalyst

Under a nitrogen atmosphere, 0.11 mole of tetraethoxysilane was added dropwise to 0.1 mole of commercially available n-butyl magnesium chloride (dissolved in n-butyl ether), and the mixture was stirred at 60° C. for 1 hour. The resulting solid was collected by filtration, and washed thoroughly with hexane.

The solid was suspended in 30 ml of kerosene, and 0.015 mole of diethyl phthalate was added dropwise to treat the solid at 80° C. for 1 hour. Furthermore, 200 ml of $TiCl_4$ was added to treat the product at 120° C. for 1 hour. The resulting solid was hot-filtered, and fully washed with hot n-decane and hexane. The Ti catalyst component contained 2.2% by weight of Ti, 63.0% by weight of Cl, 21.0% by weight of Mg and 14.9% by weight of diethyl phthalate.

Polymerization

A 50-liter autoclave was fully purged with propylene, and then charged with 13.5 kg of propylene, 2.38 g of triisobutyl aluminum, 0.58 g of diphenyldimethoxysilane and 0.26 g of the Ti catalyst component prepared above. After adding 36 liters of hydrogen, the mixture was heated, and stirred at 80° C. for 1 hour. After removing liquid propylene over 1 hour, a gaseous mixture of ethylene and propylene (the mole ratio of ethylene to propylene was 90:10) at 60° C. was added at a rate of 640 liters/hr for 1.5 hours. No adhesion of a sticky polymer was noted in the inside of the reactor. The amount of the polymer obtained was 6.6 kg. The results of analysis of the polymer and its dynamic properties are shown in Table 1.

EXAMPLE 3

Synthesis of a catalyst

Commercially available magnesium chloride (95.3 g), 488 ml of n-decane and 464.5 ml of 2-ethylhexanol were reacted at 130° C. for 2 hours to form a uniform solution. Then, 22.2 g of phthalic anhydride was added to the solution. The solution was added dropwise over the course of 20 minutes with stirring to 4 liters of titanium tetrachloride kept at $-20°$ C. The mixture was further stirred at $-20°$ C. for 1 hour. Then, the mixture was gradually heated until its temperature reached 120° C. Octyl phthalate (97.5 g) was added, and the mixture was stirred at 120° C. for 2 hours. The resulting solid portion was collected by filtration, suspended again in 4 liters of $TiCl_4$, and stirred at 120° C. for 2 hours. The solid substance was collected by filtration, and washed fully with purified hexane until no free titanium compound was detected in the washing. The resulting titanium catalyst component contained 2.0% by weight of Ti, 64.3% by weight of Cl, 22.0% by weight of Mg and 11.05% by weight of dioctyl phthalate.

Polymerization

A 50-liter autoclave was fully purged with propylene, and then charged with 13.5 kg of propylene, 4.79 g of tri-n-hexyl aluminum, 0.32 g of vinyltriethoxysilane and 0.41 g of the Ti catalyst component prepared as above. After adding 36 Nl of hydrogen, the mixture was heated, and stirred at 70° C. for 1 hour. Propylene was removed, and then 132 Nl of ethylene gas and 201 Nl of propylene gas at 60° C. were introduced into the autoclave over the course of 75 minutes. After reducing the pressure by degassing, 312 NL of ethylene gas and 35 Nl of propylene gas at 60° C. were added over the course of 65 minutes. No adhesion of the polymer to the polymerization reactor was noted, and there was obtained 5.31 kg of a white powdery polymer. The results of analysis of the polymer and its dynamic properties are shown in Table 1.

EXAMPLE 4

Synthesis of a Ti catalyst component

Fully purified hexane (100 liters) was added to a 200 liter reactor equipped with a stirrer. The inside of the reactor was fully purged with nitrogen, and 13.5 moles of triethyl aluminum, 4.5 moles of phenyltriethoxysilane and 1.5 g, calculated as the Ti atom, of the Ti-containing catalyst component formed in Example 1 were added. While maintaining a temperature of 20° C., 9.4 kg of propylene was added continuously over the course of 2 hours.

Polymerization

There was used a polymerization apparatus composed of three 100-liter polymerization reactors A, B and C connected in series and a 30-liter flush tank E disposed between the reactors B and C. The reactors A and B were for homopolymerization of propylene, and were set at a pressure of 10 kg/cm² (G) and 7 kg/cm² (G) respectively, and a temperature of 75° C. The amount of hexane as a solvent was selected such that the average total residence time of the solvent in the reactors A and B was 5 hours. The solvent was continuously fed into the reactor A. To the reactor A were fed 59.8 millimoles/hr of triethyl aluminum, 5.75 millimoles/hr of diphenyldimethoxysilane, and 1.15 mg-atoms/hr, calculated as the Ti atom, of the Ti catalyst component prepared as above were continuously fed into the reactor A. Furthermore, hydrogen was continuously fed so that the concentration of hydrogen in the reactor A was 0.51%. The polymer slurry which left the reactor B was introduced into the flush tank E, and propylene and hydrogen were purged so that the pressure of the tank E became 0.1 kg/cm²(G). The polymer slurry was then transferred to the reactor C. The reactor C was set at a pressure of 2.1 kg/cm².(G) and a temperature of 60° C. and a residence time of 1.7 hours.

During the polymerization, propylene and ethylene were added, and the concentration of gaseous ethylene was adjusted to 64.7 mole%. The resulting polymer slurry had a concentration of 250 g/liter, and was centrifugally separated at 60° C. After centrifugal separation, the yield of the polymer was 95.9%.

As a result of analysis in the individual reactors, polypropylene was found to have an MFR of 4.3 and a boiling n-heptane extraction residue of 98.5%. The activity of the catalyst was 20000 g-PP/millimole of Ti. The amount of the copolymers obtained in reactor C was 32% by weight based on polypropylene. The composition and properties of the polymer are shown in Table 1.

TABLE 1

|  | Example 2 | Example 3 | Example 4 |
|---|---|---|---|
| Polymerization |  |  |  |
| Formation of polypropylene |  |  |  |
| Amount polymerized (% by weight) | 75 | 78 | 68 |
| II (%) | 97.7 | 97.0 | 98.5 |
| Formation of copolymer |  |  |  |
| Amount polymerized (% by weight) | 25 | 8.5 | 32 |
| Composition (ethylene/propylene + ethylene) | 85 | 54 | 76 |
| Formation of polyethylene |  |  |  |
| Amount polymerized (% by weight) | — | 13.5 | — |
| Properties and composition of the polymer |  |  |  |
| MFR (g/10 minutes) | 2.1 | 1.3 | 1.95 |
| Ethylene content (% by weight) | 23.6 | 17.5 | 18.0 |
| Apparent density (g/ml) | 0.46 | 0.46 | 0.41 |
| Flowability index | 93 | 93 | 91 |
| Rubbery polymer |  |  |  |
| n-Decane-soluble portion |  |  |  |
| Amount yielded (% by weight) | 4.2 | 8.0 | 8.9 |
| $[\eta]$ | 5.15 | 2.69 | 7.02 |
| n-Decane-insoluble portion |  |  |  |
| $[\eta]$ | 3.42 | 3.78 | 3.46 |
| Ethylene content (mole %) | 27.4 | 22.6 | 15.9 |

TABLE 1-continued

|  | Example 2 | Example 3 | Example 4 |
|---|---|---|---|
| Melting point of polyethylene (°C.) | 122 | 122 | 119 |
| Falling dart impact strength (−30° C.; kg-cm) | >200 | >200 | >200 |
| Izod impact strength (−30° C.; kg-cm/cm²) | 10.9 | 9.6 | 9.7 |
| Flexural modulus (kg/cm²) | 13900 | 13800 | 12900 |

COMPARATIVE EXAMPLE 1

Synthesis of a catalyst

A titanium catalyst component was prepared in the same way as in Example 1 except that 18.4 ml of ethyl benzoate was used instead of 12.9 ml of diisobutyl phthalate, and the temperature of treatment with titanium tetrachloride was changed to 100° and 110° C. The resulting solid titanium catalyst component contained 3.8% by weight of titanium, 61.0% by weight chlorine, 20.0% by weight of magnesium and 11.8% by weight of ethyl benzoate. Fifty grams of the titanium catalyst component obtained was suspended in 20 liters of hexane, and 40 millimoles of triethyl aluminum and 13.3 millimoles of methyl p-toluate were added. Propylene was then added at 25° C. so that 150 g of propylene was polymerized.

Polymerization

The same polymerization as in Example 4 was carried out except as noted in Table 2. There was considerable adhesion of the sticky polymer to the reactor wall. The composition and properties of the polymer are shown in Table 3.

TABLE 2

|  | Comparative Example 1 |
|---|---|
| Reactor A |  |
| Triethyl aluminum | 52.2 millimoles/hr |
| Methyl-toluate | 11.5 millimoles/hr |
| Hydrogen | 3.2 mole % |
| Reactor C |  |
| Triethyl aluminum | 9.89 millimoles/hr |
| Yield | 91.1% |

TABLE 3

|  | Comparative Example 1 |
|---|---|
| Composition and properties of polymer |  |
| MFR | 1.45 g/10 minutes |
| Ethylene content | 16.1% by weight |
| Apparent density | 0.43 g/ml |
| Rubbery polymer |  |
| Amount of the n-decane-soluble portion | 7.2% by weight |
| $[\eta]$ of the n-decane-soluble portion | 5.73 |
| Falling dart impact strength (−30° C.) | 124 |
| Izod impact strength (−30° C.) | 9.1 |
| Initial flexural modulus | 13800 |

EXAMPLE 5

Synthesis of a catalyst

One hundred liters of fully purified hexane was added to a 200-liter drum equipped with a stirrer. The inside of the drum was fully purged with nitrogen gas. Triethyl aluminum (60 moles), 30 moles of phenyltriethoxysilane and 1.5 g, as Ti atom, of the titanium catalyst component synthesized in Example 1 were added. While maintaining a temperature of 20° C., 9.4 kg of propylene was continuously added over the course of 2 hours. The supernatant was thoroughly washed with fully purified hexane.

Polymerization

There was used an apparatus comprised of polymerization reactors A, B, C, and D each having a capacity of 100 liters and connected in series and flush tanks each having a capacity of 30 liters and provided between the reactors C and D. In the reactors A and B where propylene was homopolymerized, the polymerization temperature was maintained at 70° C. and the polymerization pressure, at 13 and 10 kg/cm$^2$-G respectively. The amount of hexane as a solvent was adjusted so that the average total residence time in the reactors A and B was 5 hours, and the hexane solvent was continuously fed into the reactor A. The reactor A was also charged with 1.3 millimoles/hr of triethyl aluminum and 1.15 mg atom/hr, calculated as the Ti atom, of the titanium catalyst component prepared as above, and hydrogen was also introduced continuously into the reactor A so that the concentration of hydrogen in the reactor A was 0.35 g. The polymer slurry which left the reactor B was conducted to the flush tank E, and propylene and hydrogen were purged so that the pressure became 0.1 kg/cm$^2$-G. The polymer slurry was then transferred to the reactor C which was maintained at a polymerization pressure of 1.2 kg/cm$^2$-G, a polymerization temperature of 60° C. and a residence time of 1.7 hours. During the polymerization propylene and ethylene were added, and the concentration of ethylene in the gaseous phase was adjusted to 50 mole%. The resulting polymer slurry was sent to the reactor D through the flush tank F (kept at a pressure of 0.2 kg/cm$^2$-G). The reactor D was maintained at a polymerization pressure of 2.5 kg/cm$^2$-G, a polymerization temperature of 60° C. and a residence time of 1.1 hours. Ethylene and hydrogen were added so that the concentration of ethylene in the gaseous phase (ethylene/ethylene+propylene) was 95%, and the concentration of hydrogen was 4.2 mole%. The resulting polymer slurry had a polymer concentration of 250 g/liter. It was centrifuged at 60° C., and dried. The yield of the polymer after centrifugation was 96.2%. In the stage of forming polypropylene, the resulting polypropylene had an MFR of 3.0 and a total boiling n-heptane extraction residue of 98.5%, and the activity of the catalyst was 20,000 g-PP/mmole of Ti. In the step of copolymerizing ethylene and propylene, the amount of the copolymer formed was 27% based on the amount of polypropylene.

What is claimed is:

1. A process for producing a chemically blended propylene polymer composition having an ethylene content ranging from 3 to 40% by weight and being greater than the weight of the rubbery propylene copolymer formed in stage (II) below, which comprises the following stages (I) and (II):
   (I) a first stage of polymerizing propylene containing 0 to 5 mole% of another olefin, at a temperature of about 20° C. to about 200° C. and a pressure of atmospheric pressure to about 100 kg/cm$^2$, in the presence of a catalyst composed of (A) a solid titanium catalyst component consisting essentially of titanium, magnesium, halogen, and an electron donor, the amount of (A) being from about 0.0005 to about 0.5 millimole, as the titanium atom, per liter of the polymerization volume, (B) an organoaluminum compound, and (C) an organic silicon compound having an Si—O—C bond in which the atomic ratio of Al in the component (B) to Ti in the component (A) is from about 1 to about 2000 and the mole ratio of the component (C) to Ti in the component (A) is from about 0.05 to about 200, to thereby form a crystalline propylene polymer or copolymer; and
   (II) a second stage of polymerizing propylene and ethylene, or propylene, ethylene and another olefin in the presence of the reaction product of the first stage and the same catalyst as used in the first stage, at a temperature of about 20° C. to about 200° C. and a pressure of atmospheric pressure to about 100 kg/cm$^2$, to form a rubbery propylene copolymer and a crystalline ethylene polymer or copolymer.

2. The process of claim 1 wherein stage (II) consists of step (II-1) of forming the rubbery propylene copolymer, and step (II-2) of forming the crystalline ethylene polymer or copolymer, which are separately carried out.

3. The process of claim 2 wherein step (II-1) is carried out before step (II-2).

4. The process of claim 1 wherein the formation of the rubbery propylene copolymer and the formation of the crystalline ethylene polymer or copolymer are carried out in a single step.

5. The process of claim 1 wherein based on the weight of the final chemically blended propylene polymer composition, the amount of the crystalline propylene polymer or copolymer formed in the first stage (I) is 50 to 95% by weight; the amount of the rubbery propylene copolymer formed in the second stage (II) is 2 to 40% by weight; and the amount of the crystalline ethylene polymer or copolymer formed in the second stage (II) is 3 to 40% by weight.

6. The process of claim 1 wherein in the solid titanium catalyst component (A), the magnesium/titanium atomic ratio is from about 2 to about 100; the halogen/titanium atomic ratio is from about 4 to about 100; and the electron donor/titanium mole ratio is from about 0.2 to about 10.

7. The process of claim 1 wherein the organic silicon compound (C) is a compound of the formula

$$R_nSi(OR^1)_{4-n}$$

wherein n is a number represented by $0 \leq n \leq 3$, R represents a $C_1$-$C_{20}$ hydrocarbon group, a halogen atom or a hydrogen atom, $R^1$ represents a $C_1$-$C_{10}$ hydrocarbon group, and n R groups or $(4-n)OR^1$ groups may be identical or different.

8. The process of claim 1 wherein the crystalline propylene polymer or copolymer formed in the first stage (I) has an isotactic index of at least 85.

9. The process of claim 1 wherein the other olefin used in the first stage (I) is ethylene or at least one $C_4$-$C_6$ α-olefin.

10. The process of claim 1 wherein the other olefin used in the second stage (II) is a $C_4$-$C_6$ α-olefin.

11. The process of claim 1 wherein the rubbery propylene formed in the second stage (II) has an intrinsic viscosity [η], measured in decalin at 135° C., of 1 to 15 dl/g.

12. The process of claim 1 wherein the crystalline ethylene polymer or copolymer formed in the second stage (II) is insoluble in n-decane at 23° C. and has an intrinsic viscosity [$\eta$], measured in decalin at 135° C., of 0.5 to 20 dl/g.

13. The process of claim 1 wherein the total weight of ethylene in the final propylene block copolymer composition is at least 1.1 times the weight of the rubbery propylene copolymer formed in the second stage (II).

* * * * *

UNITED STATES PATENT AND TRADEMARK OFFICE
CERTIFICATE OF CORRECTION

PATENT NO. : 4,547,552
DATED : October 15, 1985
INVENTOR(S) : AKINORI TOYOTA, ET AL.

It is certified that error appears in the above-identified patent and that said Letters Patent is hereby corrected as shown below:

IN THE CLAIMS

Claim 1, line 14, (column 18, line 1),
    delete "0.0005", insert --0.005--.

Signed and Sealed this

Twenty-fourth Day of December 1985

[SEAL]

Attest:

DONALD J. QUIGG

Attesting Officer   Commissioner of Patents and Trademarks